United States Patent
Shih

(10) Patent No.: US 7,102,591 B2
(45) Date of Patent: Sep. 5, 2006

(54) VIDEO PLAYER FOR ELECTRONIC APPARATUS

(75) Inventor: Yu Chiang Shih, Hsintien (TW)

(73) Assignee: Animation Technologies, Inc., (TW)

( * ) Notice: Subject to any disclaimer, the term of this patent is extended or adjusted under 35 U.S.C. 154(b) by 364 days.

(21) Appl. No.: 10/422,979

(22) Filed: Apr. 25, 2003

(65) Prior Publication Data
US 2004/0140946 A1    Jul. 22, 2004

(30) Foreign Application Priority Data
Jan. 21, 2003  (TW)  ............... 92201103 U

(51) Int. Cl.
*G09G 5/00*   (2006.01)
(52) U.S. Cl. .................. 345/1.1; 345/1.2; 345/536; 345/537
(58) Field of Classification Search ............ 345/156, 345/169, 530, 536, 537, 1.1, 1.2, 3.1, 547, 345/539
See application file for complete search history.

(56) References Cited

U.S. PATENT DOCUMENTS 5,488,389 A * 1/1996 Nakanishi et al. .......... 345/670
5,587,726 A * 12/1996 Moffat ........................ 345/539
6,278,807 B1 * 8/2001 Ito et al. ..................... 382/309
6,453,071 B1 * 9/2002 Ito et al. ..................... 382/232
6,885,377 B1 * 4/2005 Lim et al. ................... 345/539
2003/0174548 A1 * 9/2003 Wei et al. .................... 365/200

FOREIGN PATENT DOCUMENTS

JP       2002-084487      * 3/2002

* cited by examiner

*Primary Examiner*—Richard Hjerpe
*Assistant Examiner*—Jennifer T. Nguyen
(74) *Attorney, Agent, or Firm*—Bacon & Thomas PLLC

(57) ABSTRACT

A video player includes a CPU adapted to receive video data from an external electronic apparatus, two memories, and a video encoder connected to a video output device. The CPU stores video data from the external electronic apparatus in a first memory at first, and then stores received video data in a second memory when the first memory fully occupied, and at the same time transfers storage video data from the first memory to the video output device through the video encoder, and then switches the storage path to store received video data in the first memory again when the second memory fully occupied, and at the same time, transfers storage video data from the second memory to the video output device through the video encoder, for enabling all received video data to be completely transmitted to the video output device for output in the form of a moving picture.

18 Claims, 6 Drawing Sheets

VIDEO PLAYER FOR ELECTRONIC APPARATUS

BACKGROUND OF THE INVENTION

1. Field of the Invention

The present invention relates generally to a video player connectable for use with a mobile electronic apparatus and, more particularly, to such a video player, which comprises a CPU, two memory devices adapted to continuously alternatively receive video data from the connected external electronic apparatus subject to the control of the CPU, and to continuously alternatively transmit received video data to a display for motion video output.

2. Description of the Related Art

Following fast development of computer technology, computers of relatively higher operating power and faster operating speed are known. In order to expand the data storage capacity of a mobile computer, electronic dictionary, digital camera, or the like, electronic cards such as network cards, modem cards, SCSI cards are developed. Electronic cards for use in a computer system are commonly of PCMCIA (Personal Computer Memory Card International Association) architecture. Various PCMCIA compatible interfaces such as PCMCIA to SCSI, PCMCIA to IDE, etc. have been developed for notebook computers. Most notebook computers support plug and play as well as hot plug. In additional to PCMCIA based memory cards, various other memory cards, such as MMCs (Multimedia Cards), CFs (CompactFlash Cards), SMCs (SmartMedia Cards), MSs (Memory Sticks), SDs (Secure Digital Memory Cards) are commercially available for use in a variety of electronic apparatus (digital cameras, digital video cameras, translation machines, personal digital assistants).

However, due to limited function of the built-in CPU and related software, a PDA (personal digital assistant) is practical for displaying still photos only, not practical for displaying a moving picture.

SUMMARY OF THE INVENTION

The present invention has been accomplished under the circumstances in view. It is the main object of the present invention to provide a video player for electronic apparatus, which is connectable to a mobile electronic apparatus for displaying a moving picture through the display screen of the mobile electronic apparatus.

According to one aspect of the present invention, the video player comprises a CPU (central processing unit) electrically connectable to a card bus interface of an external electronic apparatus for receiving video data from the external electronic apparatus; a first memory electrically connected to the CPU and adapted to store video data received by the CPU; a second memory electrically connected to the CPU and adapted to store video data received by the CPU; and a video encoder electrically connected to a video output device and controlled by the CPU to encode storage video data from the first memory and the second memory for display on the video output device. When the CPU received video data from the external electronic apparatus, the CPU stores received video data in the first memory at first, and then immediately stores received video data in the second memory when the memory storage space of the first memory fully occupied, and at the same time transfers storage video data from the first memory to the video output device through the video encoder, and then switches the storage path to store received video data in the first memory again when the memory storage space of the second memory fully occupied, and at the same time, transfers storage video data form the second memory to the video output device though the video encoder, and then repeats the aforesaid video data storing and transferring procedure again and again, for enabling all video data to be completely transmitted from the external electronic apparatus t the video output device for output in the form of a moving picture. According to another aspect of the present invention, the video player further comprises a radio receiver and a remote signal decoder connected in series to the CPU, for enabling the CPU to be controlled by a remote controller.

DETAILED DESCRIPTION OF THE INVENTION

Figure 1:
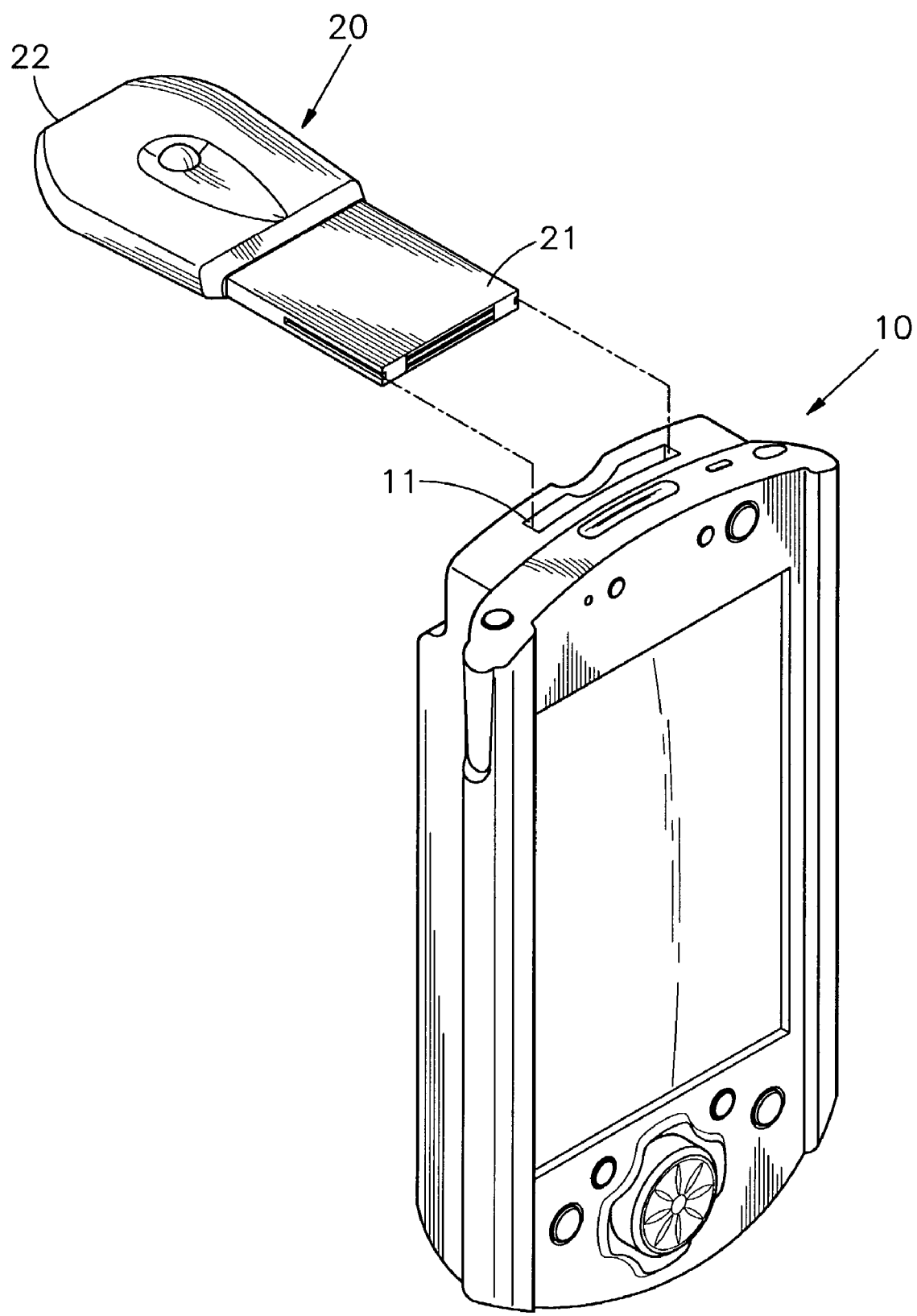
FIG. 1 is a perspective view showing the relative positioning between a video player and a mobile electronic apparatus according to the present invention.
Figure 2:
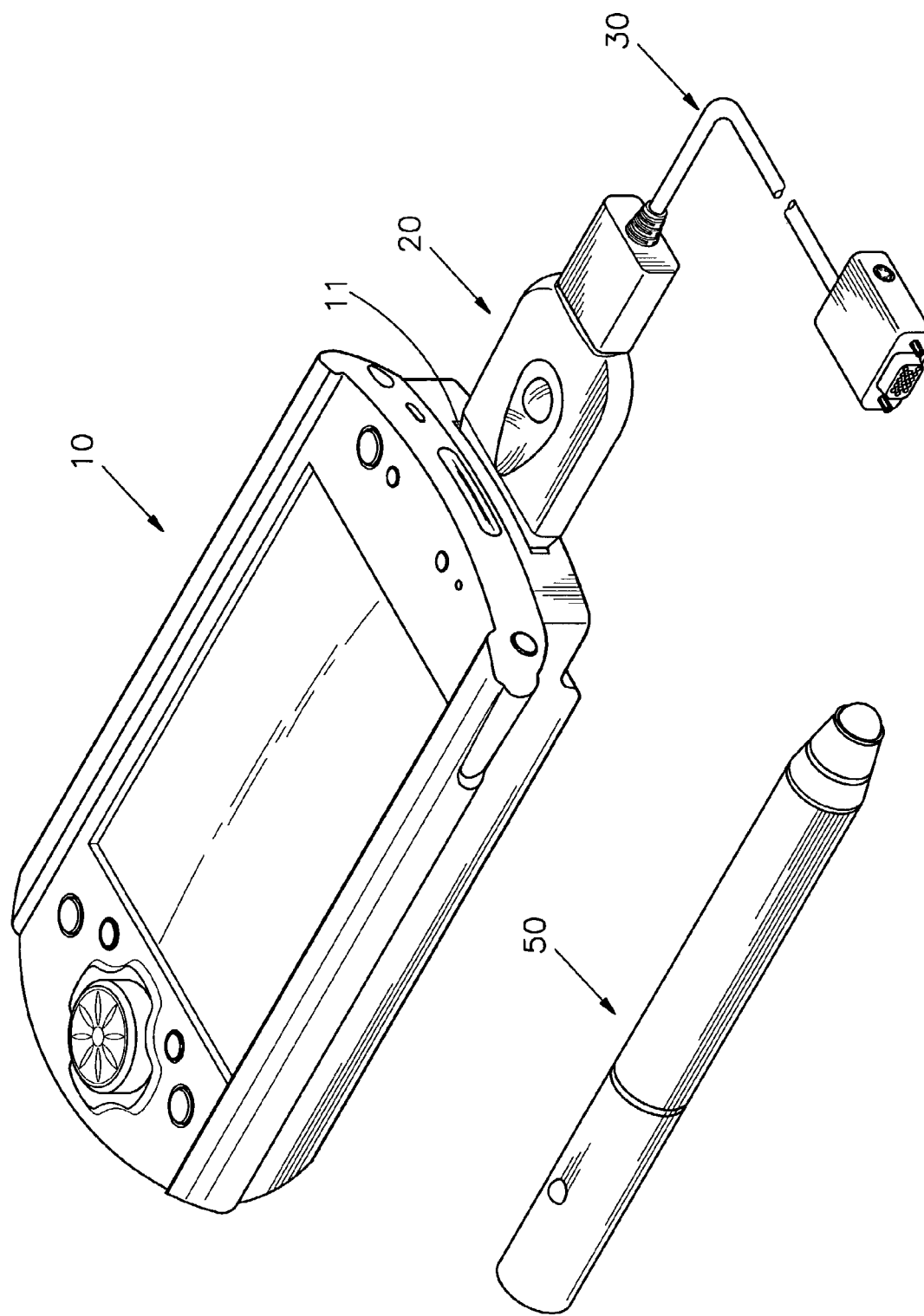
FIG. 2 is a perspective view showing the relationship between the video player and a remote control pen according to the present invention.
Figure 3:
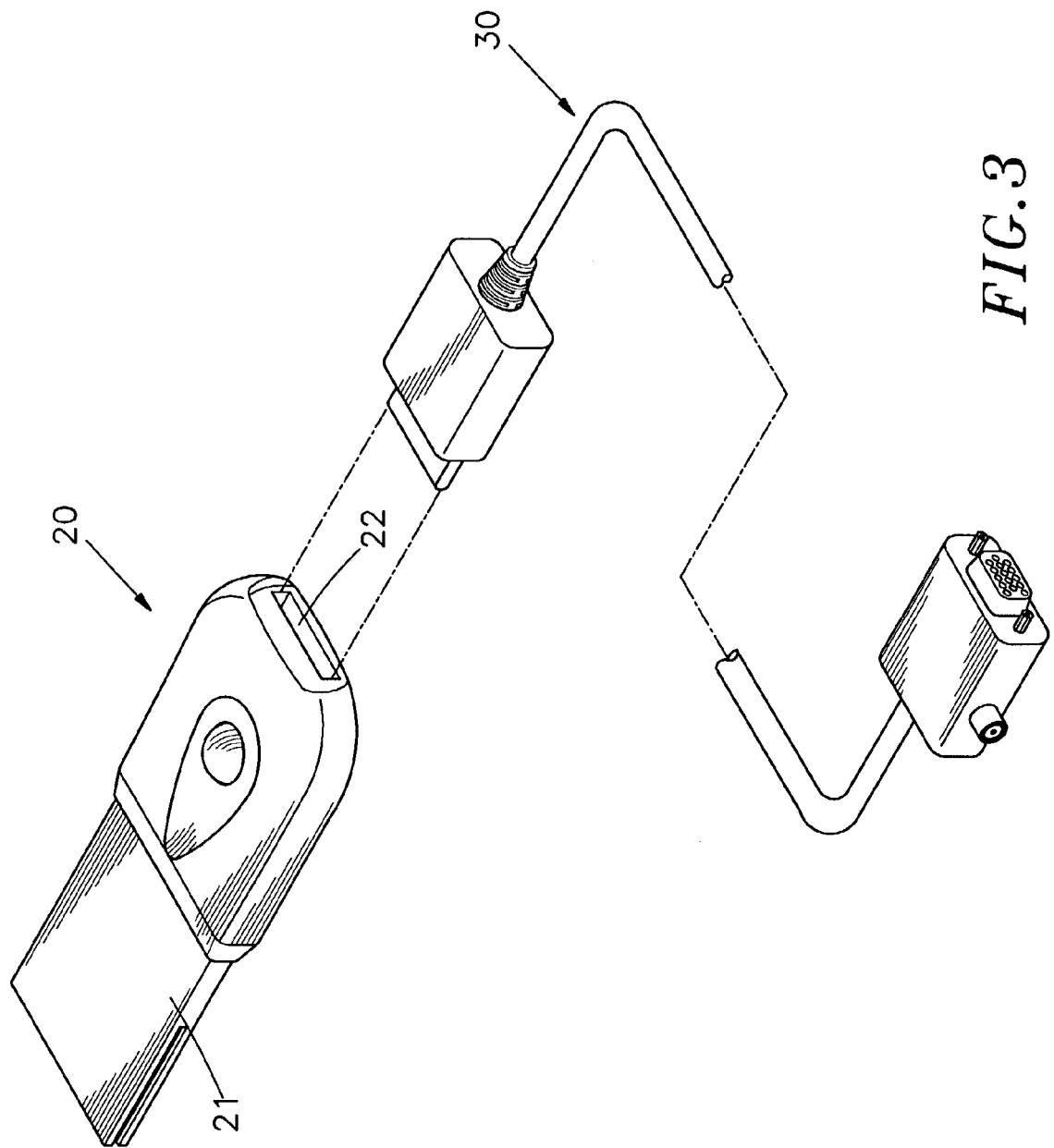
FIG. 3 is a perspective view showing the relative positioning between the video player and a signal cable according to the present invention.
Figure 4:
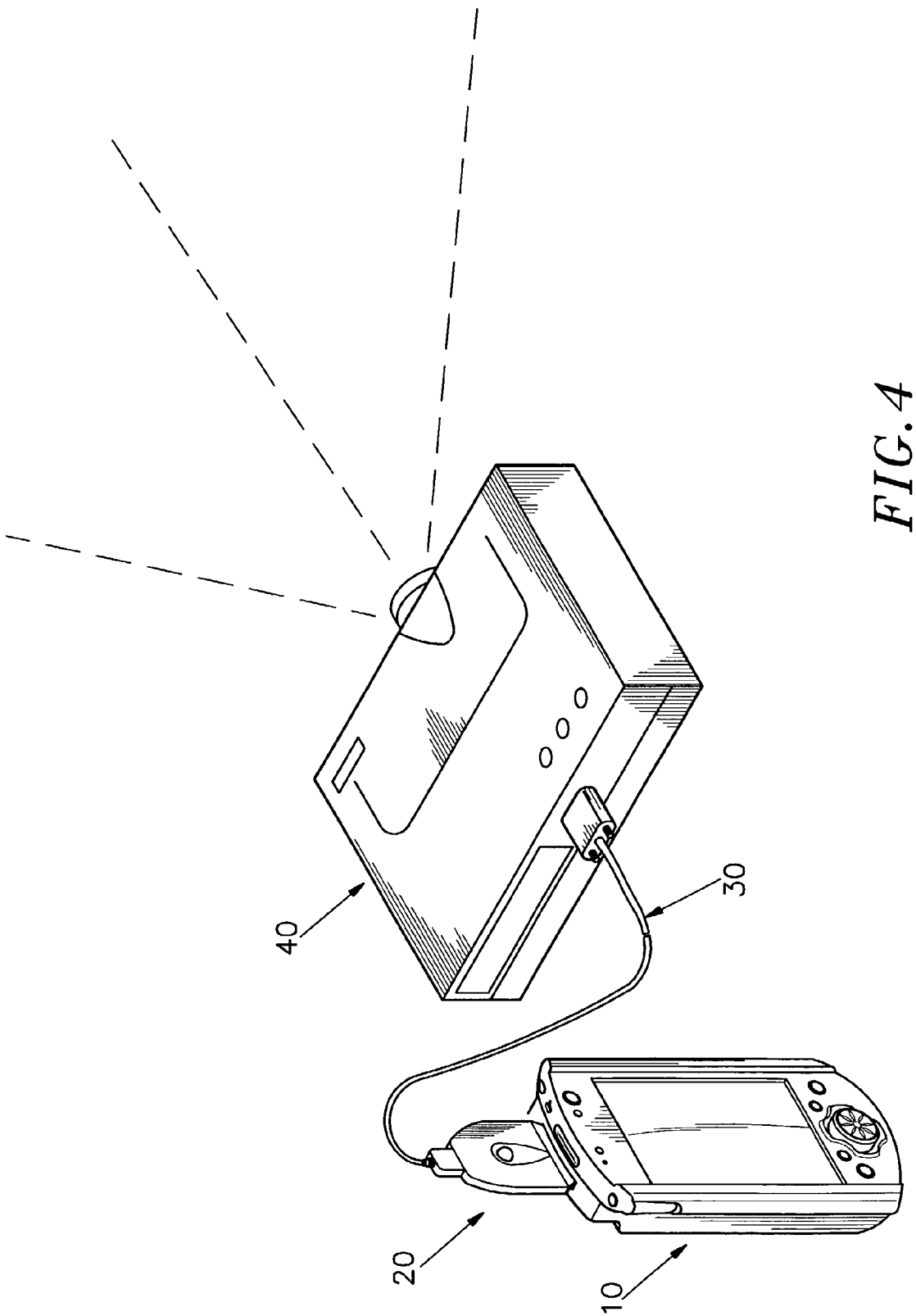
FIG. 4 is a schematic drawing showing an application example of the present invention.
Figure 5:
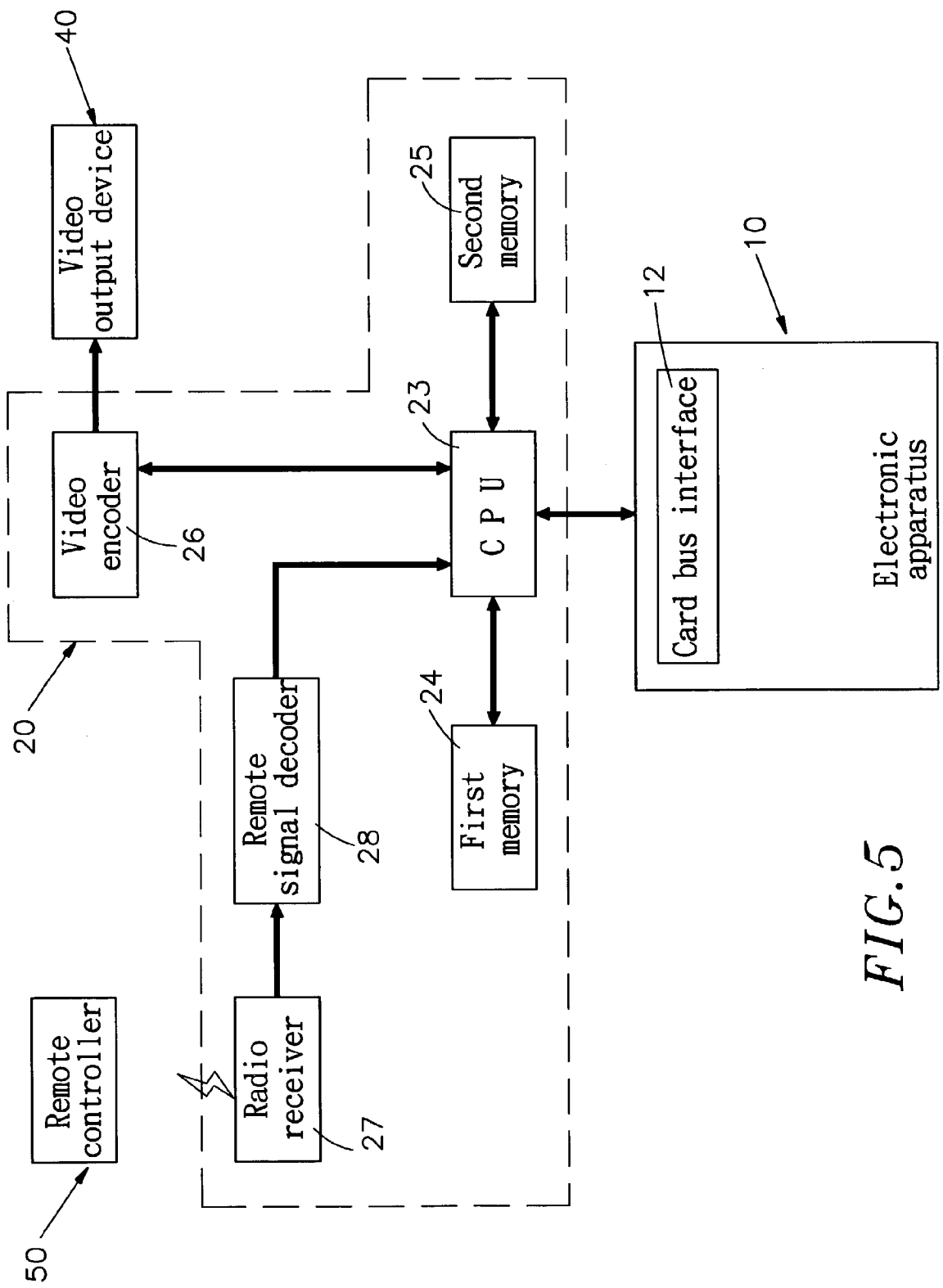
FIG. 5 is a circuit block diagram of the present invention.

Referring to FIGS. 1~5, a video player 20 is shown comprising a first connector 21 connectable to a card bus interface 12 in a port 11 of an electronic apparatus 10, and a second connector 22 adapted to receive a signal cable 30 connectable to a video output device 40. The mobile electronic apparatus 10 can be a desktop computer, PDA (personal digital assistant), tablet computer, etc. The video output device 40 can be a projector, monitor, TV set, mobile LCD (liquid crystal display), or the like. The first connector 21 of the video player 20 can be a port constructed subject to SD (Secure Digital Memory Card), CF (CompactFlash card), or PCMCIA (Personal Computer Memory Card International Association) architecture.

Referring to FIGS. 1~5 again, the video player 20 is comprised of a CPU 23, a first memory 24, a second memory 25, and a video encoder 26. The CPU 23 is electrically connected to the card bus interface 12 of the electronic apparatus 10 after insertion of the first connector 21 into the port 11. The first memory 24, the second memory 25, and the video encoder 26 are respectively electrically connected to the CPU 23. The video encoder 26 is electrically connected to the video output device 40 through the second connector 22 via the cable 30. When the CPU 23 received video data from the electronic apparatus 10, it stores received video data in the first memory 24. When the memory storage space of the first memory 24 fully occupied, the CPU 23 immediately stores received video data in the second memory 25 and, at the same time transfers storage video data from the first memory 24 to the video output device 40 through the video encoder 26. When the memory storage space of the second memory 25 fully occupied, the CPU 23 switches the storage path to store received video data in the first memory 24 again and, at the same time transfers storage video data from the second memory 25 to the video output device 40 through the video encoder 26. This video data storing and transferring procedure is repeated again and again, enabling all video data to be completely transmitted from the electronic apparatus 10 to the video output device 40 for output in the form of a moving picture.

Before transmitting video data to the video output device 40, the video encoder 26 encodes video data into video signal displayable on the video output device 40. Further, the video encoder 26 is electrically connected to the CPU 23 through a video bus and a video signal control bus, so that the CPU 23 can transmit video data through the video bus and the video signal control bus to the video encoder 26.

The first memory 24 is a random access memory (for example, a flash memory) electrically connected to the CPU 23 through a data bus, an address bus, and a control bus, enabling the CPU 23 to store video data in the first memory 24 and to fetch storage vide data from the first memory 24.

The second memory 25 is a random access memory (for example, a flash memory) electrically connected to the CPU 23 through a data bus, an address bus, and a control bus, enabling the CPU 23 to store video data in the second memory 25 and to fetch storage vide data from the second memory 25.

Referring to FIGS. 2 and 5 again, the video player 20 further comprises a radio receiver 27 (for example, an infrared receiver) and a remote signal decoder 28. The remote signal decoder 28 has a signal input end electrically connected to the radio receiver 27, and a signal output end electrically connected to the CPU 23. The radio receiver 27 is adapted to receive radio signal from a remote controller 50 (for example, a remote control pen). The user can use the remote controller 50 to control the operation (play, forward, pause, reverse, etc.) of the video output device 40.

According to the present invention, the remote signal decoder 28 is electrically connected to the CPU 23 through a remote interruption bus and a remote data bus. When the radio receiver 27 received a radio control signal from the remote controller 50, the remote signal decoder 28 decodes the signal and then sends the decoded signal to the CPU for further processing.

Figure 6:
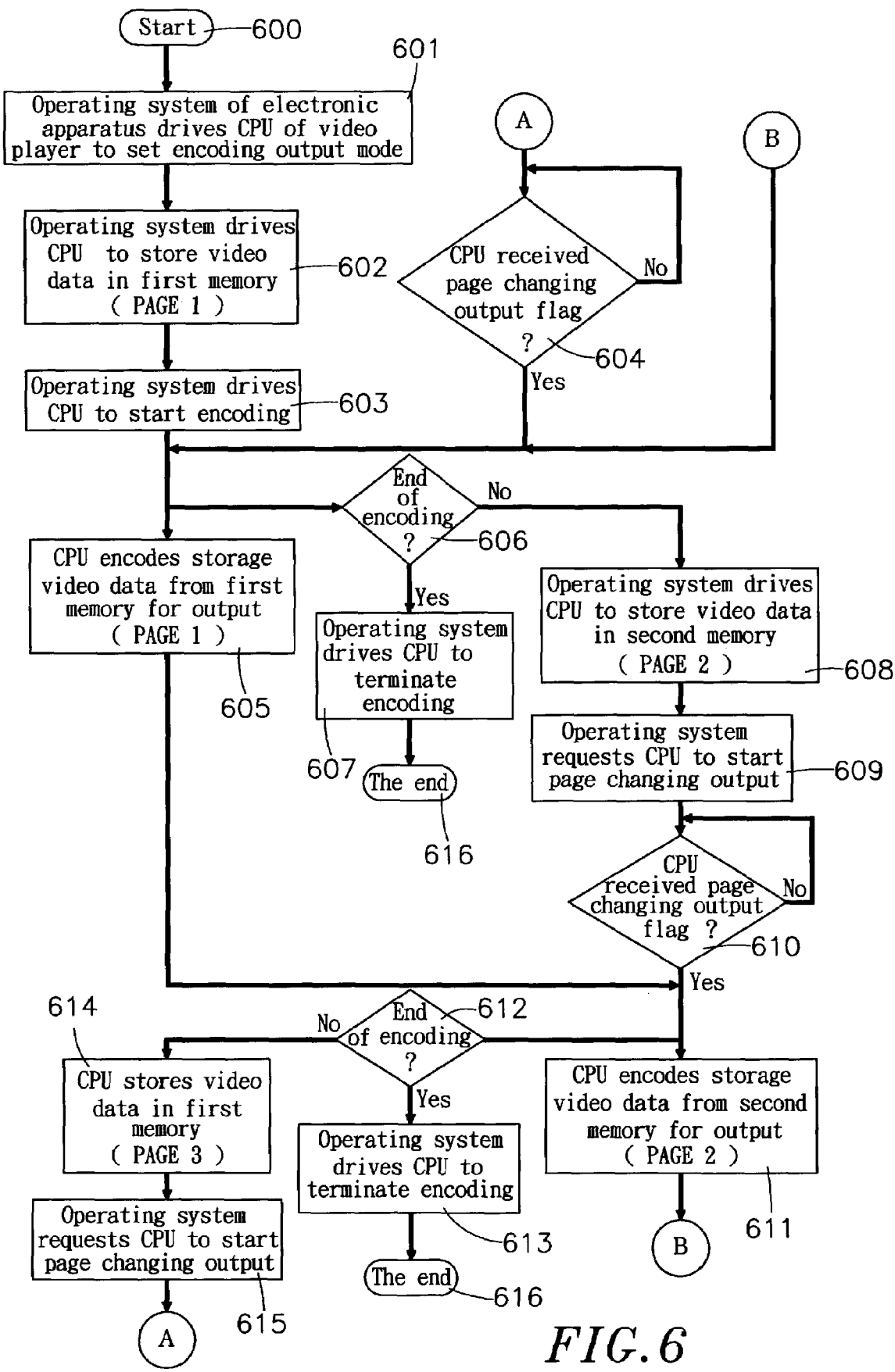
FIG. 6 is an operation flow chart of the present invention.

Referring to FIG. 6 and FIGS. 2 and 5 again, after connection of the video player 20 to the electronic apparatus 10, the video player 20 runs subject to the following steps:

(600) Start;
(601) The operating system of the electronic apparatus 10 drives the CPU 23 of the video player 20 to set the encoding output mode;
(602) The operating system drives the CPU 23 to store video data in the first memory 24;
(603) The operating system drives the CPU 23 to start encoding, and proceeds to step (605) when the CPU 23 started to encode the first memory 24, or proceeds to step (606) when the CPU 23 failed;
(604) The operating system lets the CPU 23 wait for page changing output flag, and then drives the CPU 23 to run step (605) when the CPU 23 received a page changing output flag, or drives the CPU 23 to repeat step (604) when the CPU 23 didn't receive a page changing output flag;
(605) The operating system drives the CPU 23 to encode storage video data from the first memory 24 for output, and then to run step (612);
(606) The operating system determines if the encoding procedure ended or not, and then proceeds to step (607) if positive, or step (608) if negative;
(607) The operating system drives the CPU 23 to terminate encoding;
(608) The operating system drives the CPU 23 to store video data in the second memory 25;
(609) The operating system requests the CPU 23 to start page changing output;
(610) The operating system lets the CPU 23 wait for page changing output flag, and then drives the CPU 23 to run step (611) when the CPU 23 received a page changing output flag, or drives the CPU 23 to repeat step (610) when the CPU 23 didn't receive a page changing output flag;
(611) The operating system drives the CPU 23 to encode storage video data from the second memory 25 for output, and then returns to step (605);
(612) The operating system determines if the encoding procedure ended or not, and then proceeds to step (613) if positive, or step (614) if negative;
(613) The operating system drives the CPU 23 to terminate encoding;
(614) The operating system drives the CPU 23 to store video data in the first memory 24;
(615) The operating system requests the CPU 23 to start page changing output, and then returns to step (604);
(616) The end.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A video player comprising:
a CPU (central processing unit);
a first electric connector extending from one end of said video player, the first electric connector being physically and electrically compliant with a card bus interface specification for insertion into a card bus interface slot of an external electronic apparatus to connect said CPU to the card bus interface of the external electronic apparatus;
a first memory electrically connected to said CPU and adapted to store video data received by said CPU;
a second memory electrically connected to said CPU and adapted to store video data received by said CPU; and
a video encoder electrically connected to a video output device and controlled by said CPU to encode storage video data from said first memory and said second memory for display on said video output device;
wherein when said CPU receives video data from said external electronic apparatus, said CPU stores the video data in said first memory at first, and then immediately stores the video data in said second memory when the memory storage space of said first memory is fully occupied; and at the same time transfers stored video data from said first memory to said video output device through said video encoder, and then switches the storage path to store received video data in said first memory again when the memory storage space of said second memory is fully occupied, and at the same time, transfers stored video data from said second memory to said video output device through said video encoder, and then repeats the aforesaid video data storing and transferring procedure again and again, for enabling all video data to be completely transmitted from said external electronic apparatus to said video output device for output in the form of a moving picture.

2. The video player as claimed in claim 1, wherein said external electronic apparatus is a personal digital assistant.

3. The video player as claimed in claim 1, wherein said external electronic apparatus is a notebook computer.

4. The video player as claimed in claim 1, wherein said external electronic apparatus is table personal computer.

5. The video player as claimed in claim 1, further comprising a second electric connector disposed at a second end of said video player and configured to connect said video encoder to said video output device through a video signal cable.

6. The video player as claimed in claim 5, wherein said video output device is a projector.

7. The video player as claimed in claim 5, wherein said video output device is a monitor.

8. The video player as claimed in claim 5, wherein said video output device is a TV set.

9. The video player as claimed in claim 5, wherein said video output device is a liquid crystal display.

10. The video player as claimed in claim 5, wherein said video encoder is electrically connected to said CPU through a video bus and a video signal control bus for enabling said CPU to transmit storage video data from said first memory and said second memory to said video encoder through said video bus and said video signal control bus.

11. The video player as claimed in claim 10, wherein said first memory is a random access memory electrically connected to said CPU through a data bus, an address bus, and a control bus, for enabling said CPU to store video data in said first memory or fetch video data from said first memory.

12. The video player as claimed in claim 11, wherein said second memory is a random access memory electrically connected to said CPU through a data bus, an address bus, and a control bus, for enabling said CPU to store video data in said second memory or fetch video data from said second memory.

13. The video player as claimed in claim 12, further comprising a radio receiver adapted to receive a radio signal from a remote controller for controlling the operation of said CPU, and a remote signal decoder electrically connected in series between said radio receiver and said CPU adapted to decode the radio signal received by said radio receiver into a control signal readable to said CPU for enabling said CPU to be controlled by the remote controlling sending said radio signal.

14. The video player as claimed in claim 13, wherein said radio receiver is an infrared receiver.

15. The video player as claimed in claim 14, wherein said remote signal decoder is electrically connected to said CPU through a remote interruption bus and a remote data bus.

16. The video player as claimed in claim 1, wherein said first electric connector is a port constructed subject to SD (Secure Digital Memory Card) architecture.

17. The video player as claimed in claim 1, wherein said first electric connector is a port constructed subject to CF (CompactFlash card) architecture.

18. The video player as claimed in claim 1, wherein said first electric connector is a port constructed subject to PCMCIA (Personal Computer Memory Card International Association) architecture.

\* \* \* \* \*